United States Patent
Sadanowicz et al.

(10) Patent No.: US 10,464,540 B2
(45) Date of Patent: Nov. 5, 2019

(54) METHOD OF MANUFACTURING BRAKE BOOSTERS

(71) Applicant: Robert Bosch GmbH, Stuttgart (DE)

(72) Inventors: David Sadanowicz, Canton, MI (US); Charles Byron Horner, Jr., South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 15/653,713

(22) Filed: Jul. 19, 2017

(65) Prior Publication Data

US 2018/0022330 A1 Jan. 25, 2018

Related U.S. Application Data

(60) Provisional application No. 62/363,960, filed on Jul. 19, 2016.

(51) Int. Cl.
*B60T 8/30* (2006.01)
*B60T 13/575* (2006.01)
(Continued)

(52) U.S. Cl.
CPC .............. *B60T 8/30* (2013.01); *B60T 13/52* (2013.01); *B60T 13/575* (2013.01);
(Continued)

(58) Field of Classification Search
CPC ...... G01L 5/0038; B23P 2700/50; B60T 8/30; B60T 13/52; B60T 13/575; B60T 17/223; B60T 8/449
See application file for complete search history.

(56) References Cited

U.S. PATENT DOCUMENTS

| 4,283,911 A | 8/1981 | Nakamura et al. |
| 4,934,249 A | 6/1990 | Gautier et al. |

(Continued)

FOREIGN PATENT DOCUMENTS

| GB | 2027144 A | 2/1980 |
| JP | 63269768 A | * 11/1988 |

(Continued)

OTHER PUBLICATIONS

Machine Translation of JP 63-269768 A (Year: 1988).*
(Continued)

*Primary Examiner* — Christopher J Besler
(74) *Attorney, Agent, or Firm* — Michael Best & Friedrich LLP

(57) ABSTRACT

A method of manufacturing vehicle brake boosters includes load testing a plurality of reaction discs and sorting the load-tested reaction discs into multiple, separate batches based on the load test results. A first batch of plunger plates is formed to an axial length to correspond with a first of the separate batches of reaction discs. A first batch of the vehicle brake boosters is assembled with a first one of the multiple, separate batches of reaction discs and the first batch of plunger plates to achieve a target jump-in force. A second batch of plunger plates is formed to an axial length to correspond with a second one of the separate batches of reaction discs. A second batch of the vehicle brake boosters is assembled with a second one of the multiple separate batches of reaction discs and the second batch of plunger plates to achieve the target jump-in force.

8 Claims, 10 Drawing Sheets

(51) Int. Cl.
  *B60T 17/22* (2006.01)
  *B60T 13/52* (2006.01)
  *B60T 8/44* (2006.01)
  *G01L 5/00* (2006.01)

(52) U.S. Cl.
  CPC ............ *B60T 17/223* (2013.01); *B60T 8/449* (2013.01); *G01L 5/0038* (2013.01)

(56) References Cited

U.S. PATENT DOCUMENTS

| | | |
|---|---|---|
| 5,016,520 A | 5/1991 | Gautier |
| 5,179,834 A | 1/1993 | Rauschenbach |
| 5,214,995 A | 6/1993 | Gautier |
| 5,233,905 A | 8/1993 | Fecher |
| 5,293,808 A | 3/1994 | Rueffer et al. |
| 5,907,990 A | 6/1999 | Satoh |
| 6,092,453 A | 7/2000 | Preker |
| 6,135,007 A | 10/2000 | Tsubouchi |
| 6,755,122 B2 | 6/2004 | Burgdorf et al. |
| 6,931,979 B2 | 8/2005 | Bacardit et al. |
| 7,032,496 B2 | 4/2006 | Schramm et al. |
| 8,776,665 B2 | 7/2014 | Richard et al. |
| 2002/0158510 A1 | 10/2002 | Kobayashi et al. |
| 2013/0082513 A1 | 4/2013 | Yamaga |
| 2015/0283986 A1 | 10/2015 | Grace et al. |
| 2015/0336550 A1 | 11/2015 | Yamaga |

FOREIGN PATENT DOCUMENTS

| | | |
|---|---|---|
| JP | H07205797 A | 8/1995 |
| JP | H09286322 A | 11/1997 |
| WO | 0170551 A1 | 9/2001 |

OTHER PUBLICATIONS

Partial European Search Report from the European Patent Office for Application No. 17181510.3 dated Dec. 13, 2017 (14 pages).
Extended European Search Report from the European Patent Office for Application No. 182137182 dated Mar. 21, 2019 (7 pages).

* cited by examiner

METHOD OF MANUFACTURING BRAKE BOOSTERS

CROSS-REFERENCE TO RELATED APPLICATIONS

This application claims priority to U.S. Provisional Patent Application No. 62/363,960, filed Jul. 19, 2016, the entire contents of which are incorporated by reference herein.

BACKGROUND

The present invention relates to vehicle brake boosters and the method of manufacturing. More particularly, the invention relates to a process for controlling a booster jump-in point.

SUMMARY

The invention provides, in one embodiment, a method of manufacturing a series of vehicle brake boosters. Each vehicle brake booster having a brake input member configured to receive a braking input force, a brake output member configured to supply a braking output force in excess of the braking input force, an elastic reaction disc, and a plunger plate. A plurality of reaction discs are load tested for the series of vehicle brake boosters. The load-tested reaction discs are sorted into multiple, separate batches based on the load test results. A first batch of plunger plates for the series of vehicle brake boosters is formed to an axial length to correspond with a first of the separate batches of reaction discs. A first batch of the series of vehicle brake boosters is assembled with a first one of the multiple, separate batches of reaction discs and the first batch of plunger plates to achieve a target jump-in force. A second batch of plunger plates for the series of vehicle brake boosters is formed to an axial length to correspond with a second one of the separate batches of reaction discs. A second batch of the series of vehicle brake boosters is assembled with a second one of the multiple separate batches of reaction discs and the second batch of plunger plates to achieve the target jump-in force.

The invention provides, in another embodiment, a method for adapting a vehicle brake booster for a desired jump-in force. An elastic reaction disc is provided for assembly in the brake booster between an input member and an output member. The reaction disc is load tested. A plunger plate is selected with an axial length to complement the reaction disc, based on the load test results of the reaction disc.

The invention provides, in yet another embodiment, a method for adapting a vehicle brake booster for a desired jump-in force. An elastic reaction disc is mounted to a testing apparatus relative to a first plunger plate of a first axial length. The reaction disc is load tested to determine a tested jump-in force based on the first axial length of the first plunger plate. The reaction disc is paired with a second plunger plate of a second axial length to decrease the discrepancy between the tested jump-in force and the desired jump-in force.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
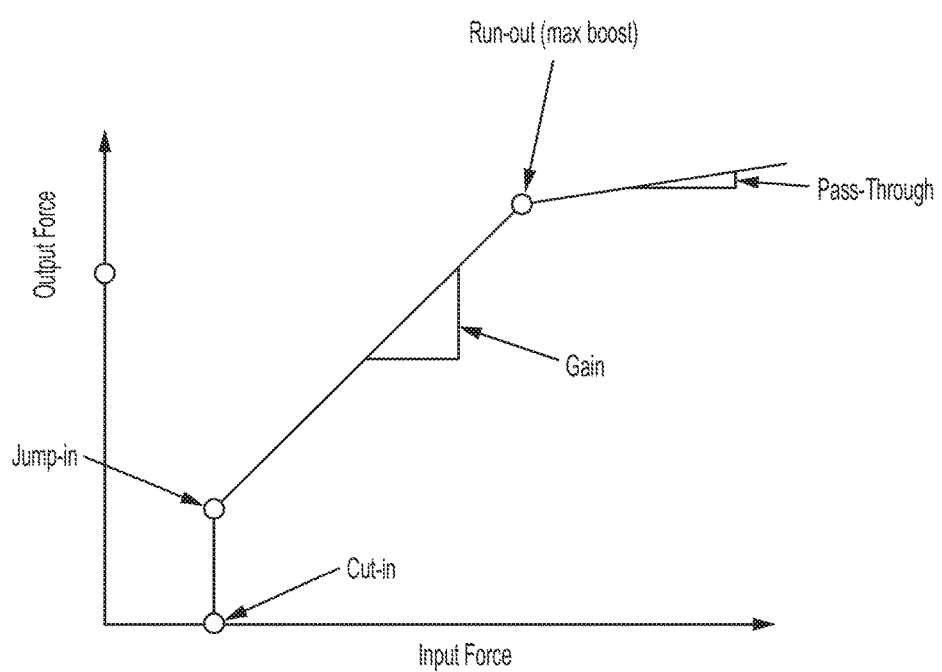
FIG. 1 is a plot of output force versus input force for a vehicle brake booster.
Figure 2:
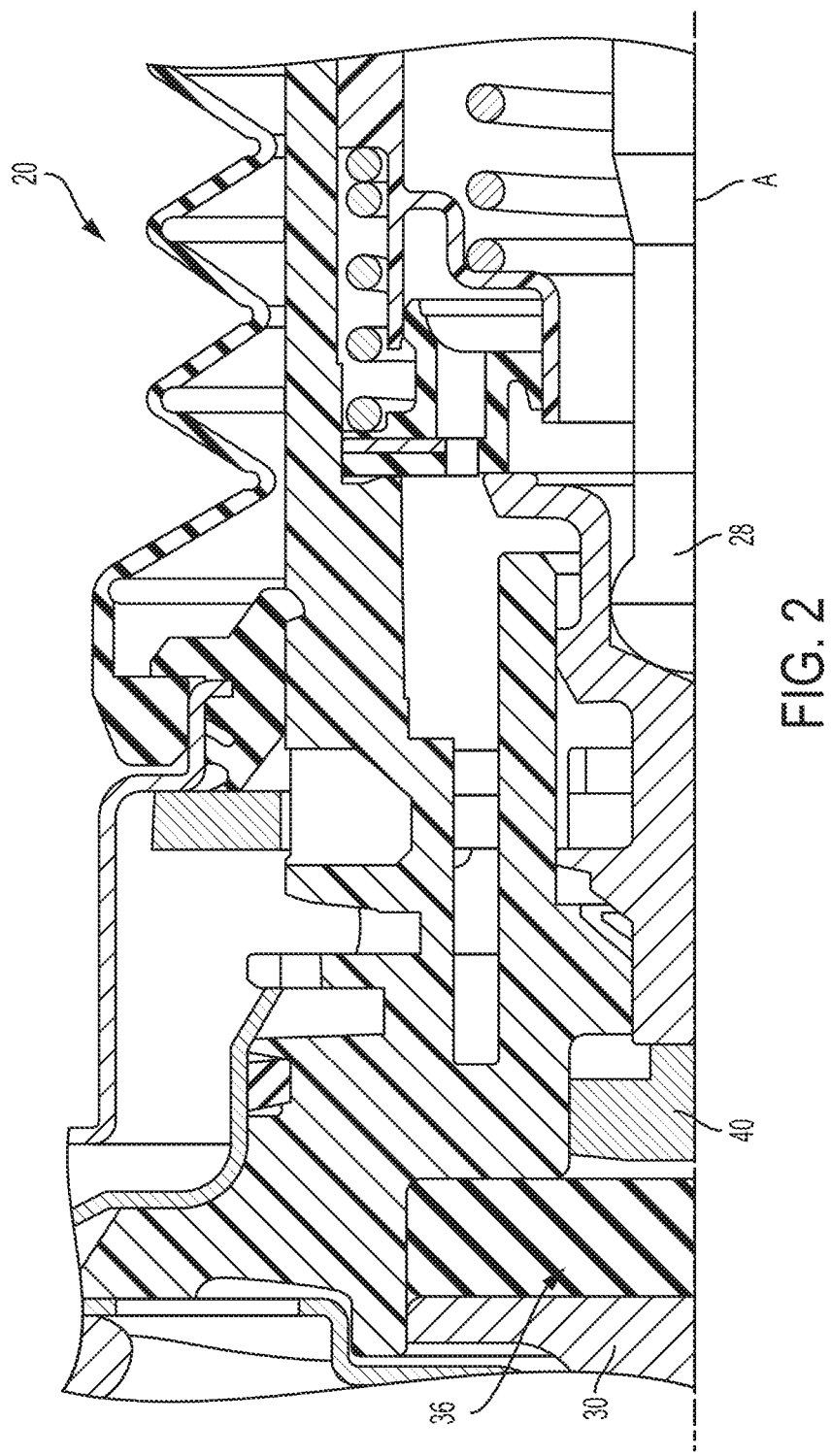
FIG. 2 is a cross-sectional view of a portion of a vehicle brake booster including a reaction disc.

FIG. 1 illustrates a plot for output force versus input force for a vehicle brake booster 20, a portion of which is shown in FIG. 2. Brake boosters (e.g., vacuum-assisted or electrically-assisted vehicle brake boosters) exhibit the behavior illustrated in FIG. 1 which, upon initial application of input force (i.e., at an input member 28 coupled to a brake actuator), does not immediately generate an output force (i.e., at an output member 30 coupled to a master cylinder). This initial condition continues with increasing input force up until a "cut-in" input force is reached. At the cut-in input force, the brake booster 20 activates and an output force is generated. The output force does not commence gradually from zero, but rather, "jumps-in" to a non-zero force referred to as the jump-in output force when the input force reaches the cut-in force. After the input force exceeds the cut-in force, the pre-established relationship between input force and output force commences over the remainder of the operable range of increased input force. This may include a linear portion, having a fixed gain (i.e., slope of output force to input force). The linear gain relationship can continue up until "run-out" or maximum boost, where the output force to input force plot tapers off (i.e., slope reduction) substantially from the relationship established from the cut-in.

FIG. 2 illustrates a portion of the vehicle brake booster 20 in cross-section, and only one half is shown as the components can be symmetrical about a central axis A. The booster 20 includes an input member 28 configured to receive a braking input force for boosting by the booster 20. The input force and the additional boost force are conveyed to an output member or pushrod 30 which may be coupled to a master cylinder input for actuating one or more hydraulic brake devices. The booster 20 can be divided into separate chambers, both of which can be substantially evacuated of air such that a vacuum condition exists during normal running operation when a brake input is not received by the input member 28. When the input member 28 is actuated, air at atmospheric pressure is allowed to enter only one of the chambers to provide boosting of the input force to a higher force at the output pushrod 30. However, alternative suitable boosting schemes may be substituted in some aspects of the invention.

Between the input member 28 and the output pushrod 30, a reaction disc 36 and a plunger plate 40 are provided in contact with one another. The reaction disc 36 and the plunger plate 40 are wholly or predominantly responsible for determining the initial behavior, including the jump-in force, of the booster 20. The reaction disc 36 can be constructed of a resilient or elastic material (e.g., rubber) that is subject to deformation during operation of the booster 20 as the reaction disc 36 is pressed upon by an end surface of the plunger plate 40. The plunger plate 40 can be constructed of metal or another relatively rigid material that is not subject to deformation during operation of the booster 20.

Figure 3:
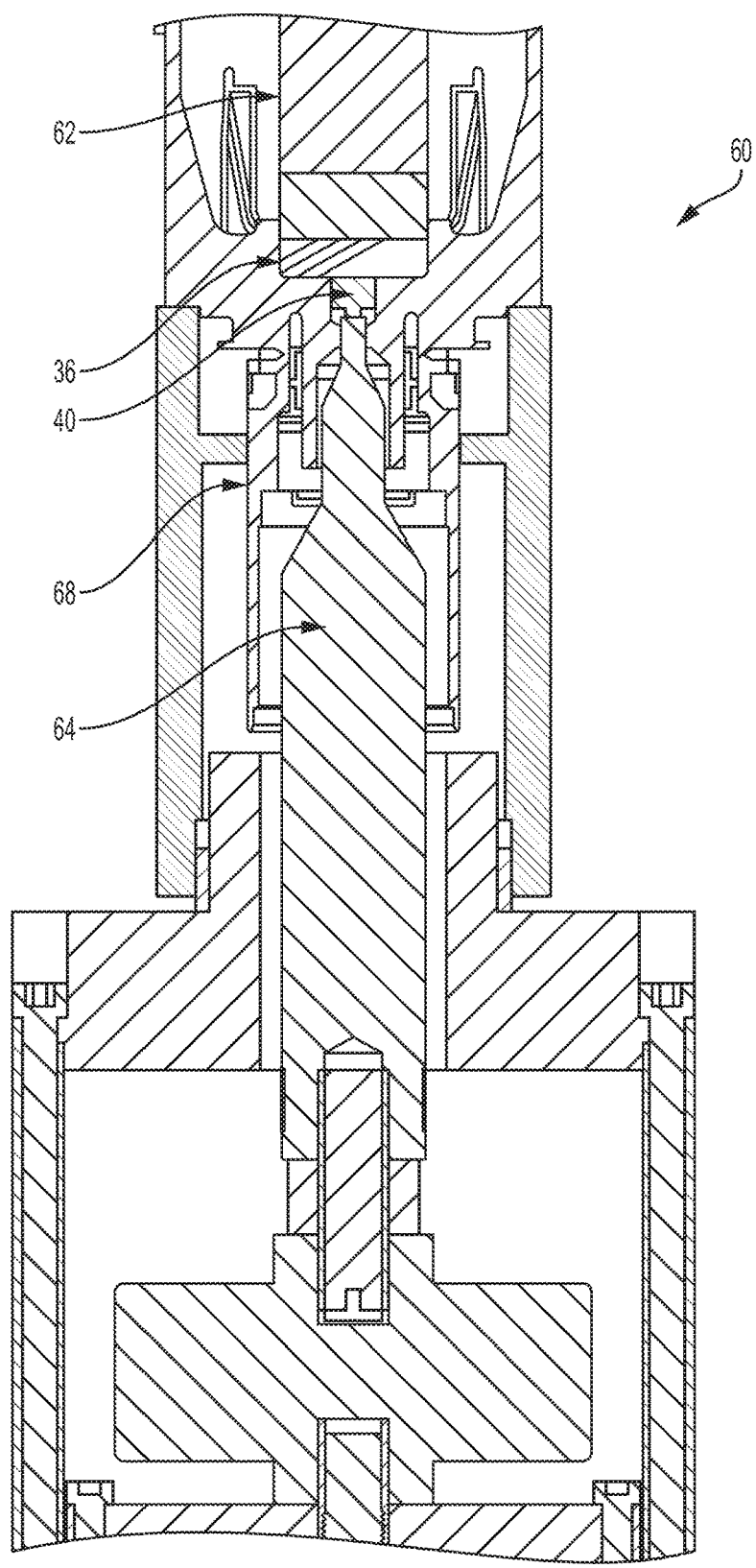
FIG. 3 is cross-sectional view of a load test fixture for testing reaction discs for jump-in force.
Figure 4:
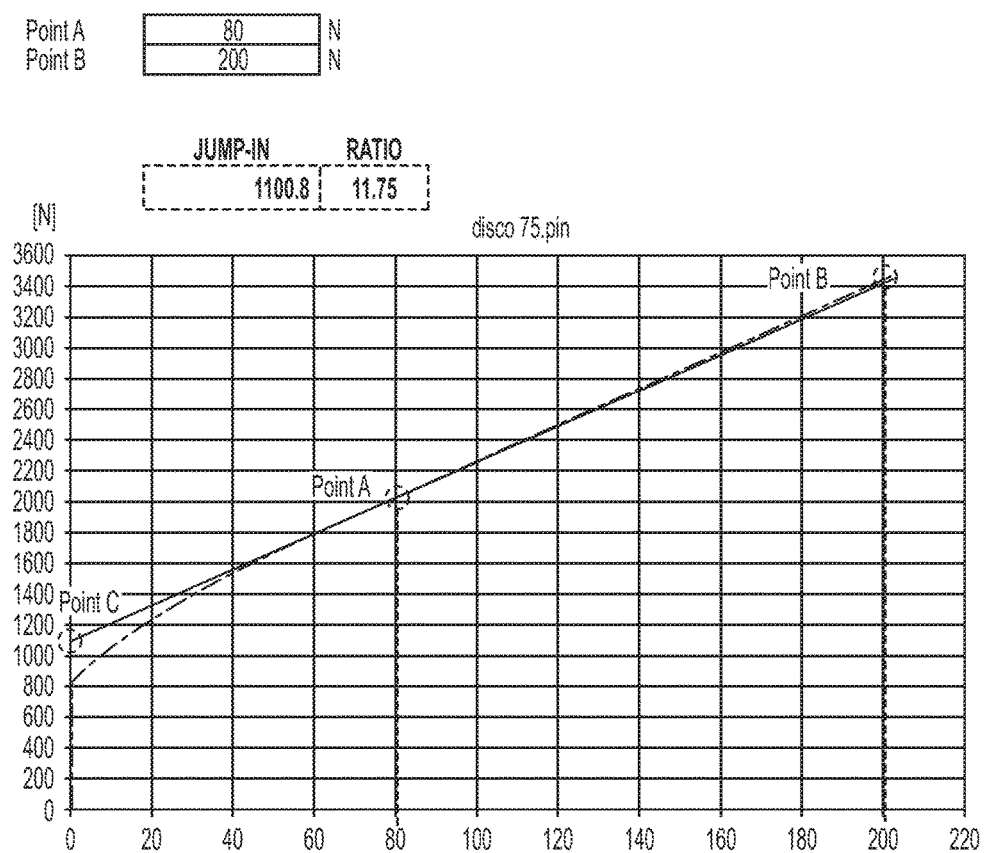
FIG. 4 is a plot of exemplary output data from the load test fixture of FIG. 3.

As shown in FIG. 3, a load testing apparatus 60 is provided for performing a load test on the reaction disc 36 and the plunger plate 40. The load testing apparatus 60 includes an upper fixture 62 that simulates the output pushrod 30, and a lower fixture 64 that includes a sensor (e.g., load cell) to measure the jump-in force. The reaction disc 36 and the plunger plate 40 are interposed between the upper and lower fixtures 62, 64. The reaction disc 36 and the plunger plate 40 may be at least partially received within a valve body 68. The plunger plate 40 may be a designated component having a known axial length and used with the load testing apparatus 60 for testing an entire group of reaction discs 36 before the reaction discs 36 are supplied for assembly with respective vehicle brake boosters 20. Once a load test is performed for a particular reaction disc 36, the jump-in force provided thereby is noted, for example, according to the graph shown in FIG. 4. In the illustrated non-limiting example, points A and B are data points from the load test, plotted as input force versus output force. The line between points A and B is extrapolated to the y-axis, where point C is defined. Point C represents the measured jump-in force for the reaction disc 36. In the illustrated example, the ratio of output force to input force is 11.75:1 based on the slope of the line between measured points A and B and the jump-in force is 1100.8 N.

Figure 5:
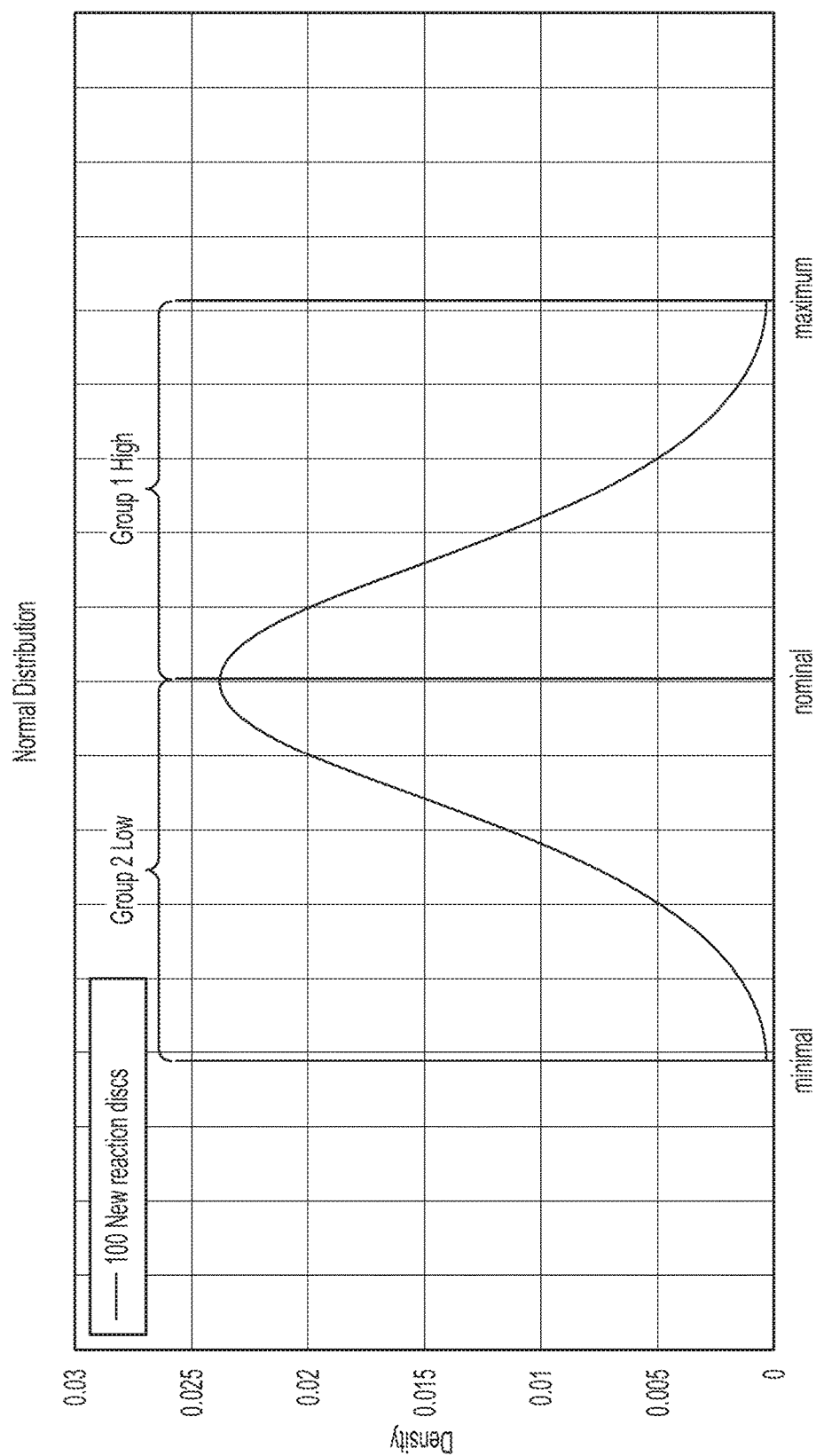
FIG. 5 is a plot of a statistical distribution of the measured jump-in force of a group of reaction discs.
Figure 6:
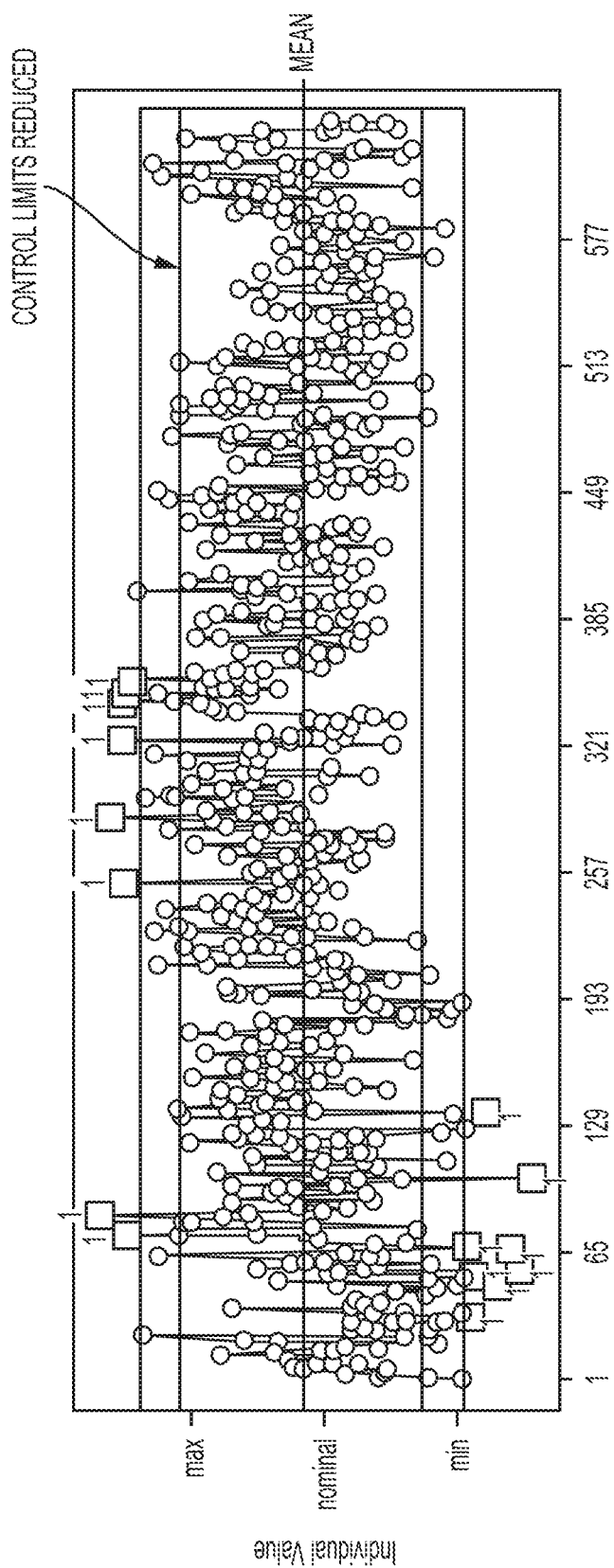
FIG. 6 is an individual control chart for brake booster jump-in force, showing a reduction in upper and lower control limits.

In producing a series of vehicle brake boosters 20 on an assembly line of a manufacturing facility to meet a consistent performance standard, the reaction discs 36 that have been load tested can first be grouped into separate batches. In the simplest form, this may include separating all the reaction discs 36 into a "high" group and a "low" group, according to the measured jump-in force from the load test, with the high group providing a jump-in force above a mean or target value, and the low group providing a jump-in force below the mean or target value. The separate batches may include more than two groups of reaction discs 36. Furthermore, some reaction discs 36 may not be within the desired range, and may be discarded. For example, FIG. 5 shows an exemplary statistical distribution, including high and low outliers as determined by a designated number of standard deviations. With the pre-sorted batches of reaction discs 36, the assembly process for production of a series of brake boosters 20 can be improved as discussed below. The individual values chart, or I-chart, of FIG. 6 shows how an existing production process with existing upper and lower control limits can be improved by bringing the upper and lower control limits closer to the mean value.

Figure 7A:
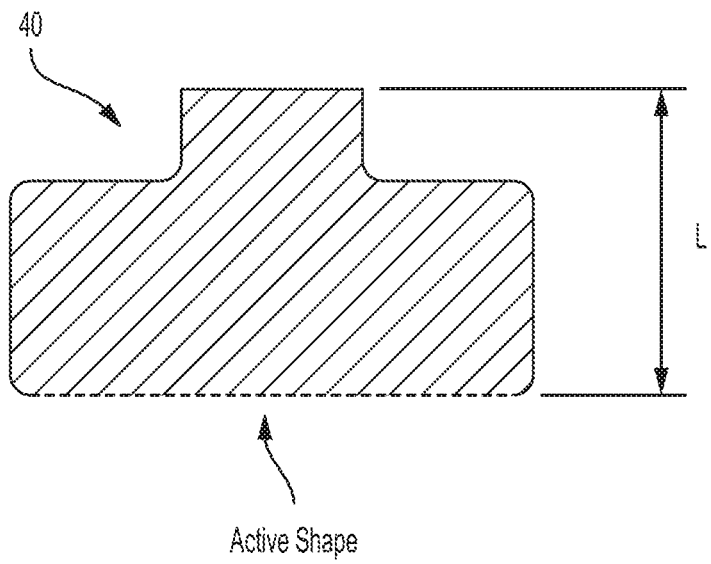
FIGS. 7A and 7B are cross-sectional views of flat and conical type plunger plates for the vehicle brake boosters.
Figure 7B:
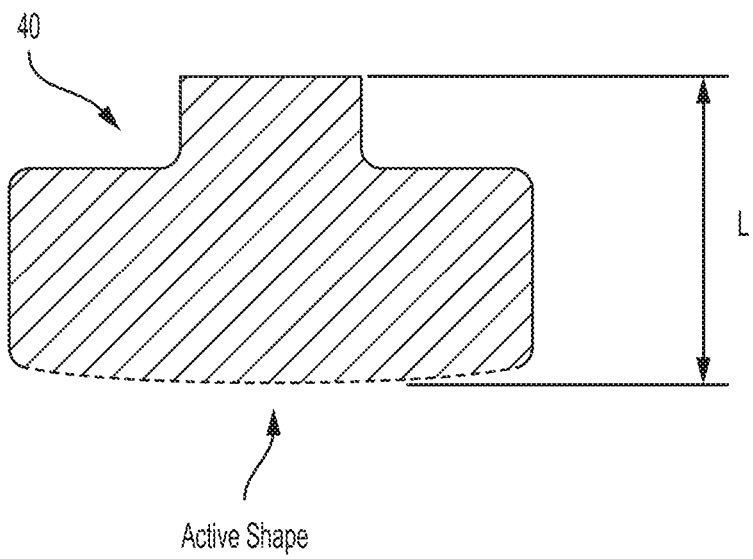
Figure 8:
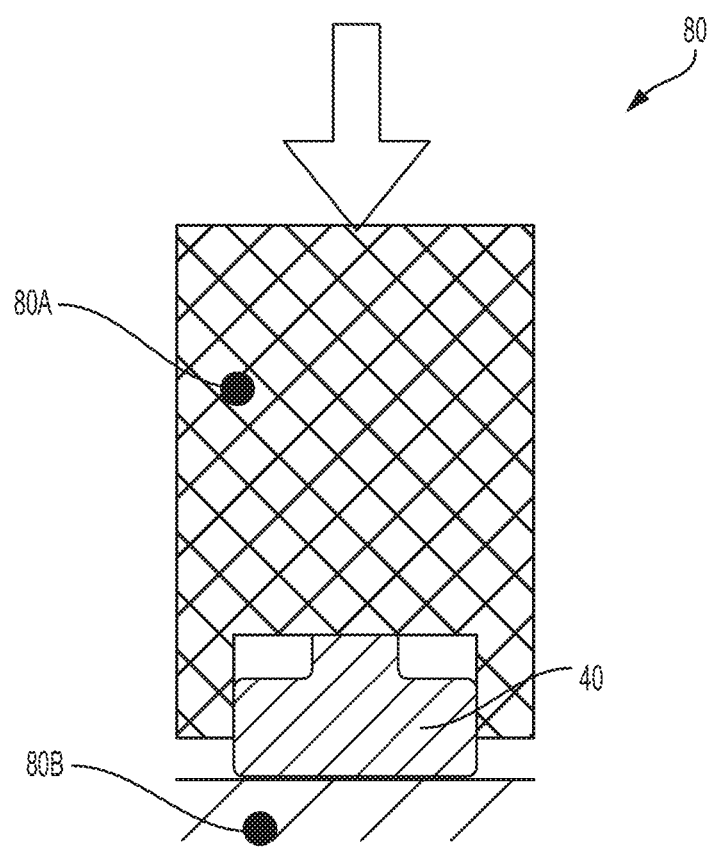
FIG. 8 is a cross-sectional view illustrating a tool and process for setting final plunger plate length by deformation.

A tool 80 for performing a length correction process on existing plunger plates 40 is shown in FIG. 8. The tool 80 includes a press 80A and a base 80B, between which a plunger plate 40 is positioned and subjected to a pressing load. The plunger plates 40 for the production series of brake boosters 20 can be of the flat type shown in FIG. 7A or the conical shape shown in FIG. 7B. Although all the plunger plates 40 are produced in a prior process to achieve a nominal axial length L, the process shown in FIG. 8 with the tool 80 acts as a supplementary or final length correction that is based on data from the load testing of the reaction discs 36 so that a group or batch of plunger plates 40 can be produced with a precisely controlled axial length that is complementary with a batch of the reaction discs 36 to more closely achieve the desired target jump-in force for the brake boosters 20 produced with those batches of reaction discs 36 and plungers 40. For example, the batch of high jump-in force reaction discs 36 can be slated for first production, and the corresponding batch of plunger plates 40 can be processed through the tool 80 (i.e., plastically deformed to reduce the axial length L). The axial length L of the plunger plates 40 for the batch of high jump-in force reaction discs 36 can be set to a relatively low value. Then, the batch of low jump-in force reaction discs 36 can be slated for second production, and the corresponding batch of plunger plates 40 can be processed through the tool 80 (i.e., plastically deformed to reduce the axial length L). The axial length L of the plunger plates 40 for the batch of low jump-in force reaction discs 36 can be set to a relatively high value compared to the final axial length of the plunger plates 40 for the high jump-in force reaction discs 36. By having the axial length L of the plunger plates 40 tailored to a specific batch of reaction discs 36, complementary component pairs are generated that are substantially more uniform in jump-in characteristics within the vehicle brake boosters 20. Said another way, the production of vehicle brake boosters 20 can include deforming a first plunger plate 40 more than a second plunger plate 40, where the first plunger plate 40 is paired with a reaction disc 36 tested for relatively high jump-in force and the second plunger plate 40 is paired with a reaction disc 36 tested for relatively low jump-in force.

Figure 9A:
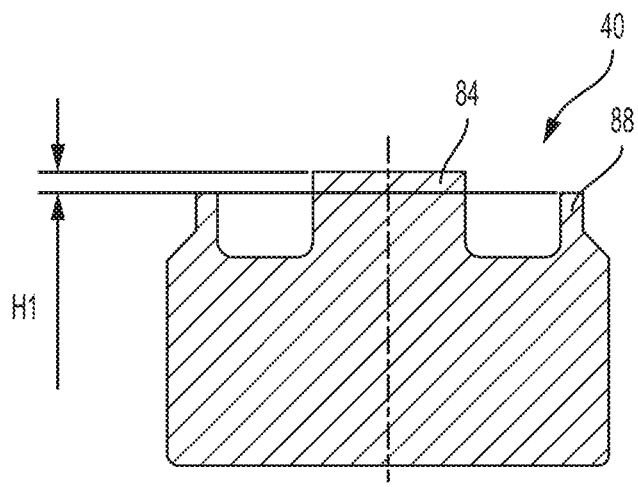
FIGS. 9A and 9B illustrate exemplary tolerance parameters for formed plunger plates.
Figure 9B:
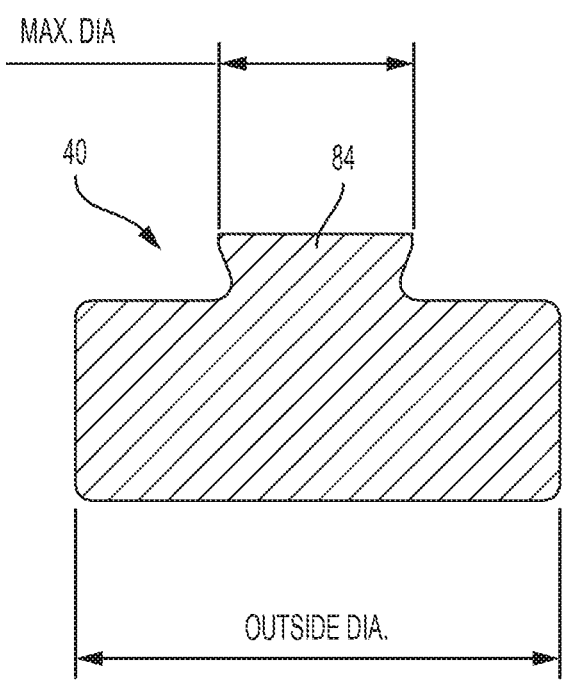

In the case of a conical shaped plunger plate 40 as shown in FIG. 7B, the deforming operation with the tool 80 is designed not to deform the active conical surface of the plunger plate 40. An axially-centrally located reduced diameter protruding portion 84 of the plunger plate 40 may be checked for conformance to certain tolerance thresholds after the pressing with the tool 80. For example, in some cases, a minimum height H1 must be maintained between the reduced diameter protruding portion 84 and a radially outer flange portion 88 as shown in FIG. 9A. Further, a diameter of the protruding portion 84 may be confirmed to be no greater than a predetermined maximum value as shown in FIG. 9B. An outside diameter of the plunger plate 40 may be checked to ensure that it does not expand more than a predetermined maximum value.

Figure 10:
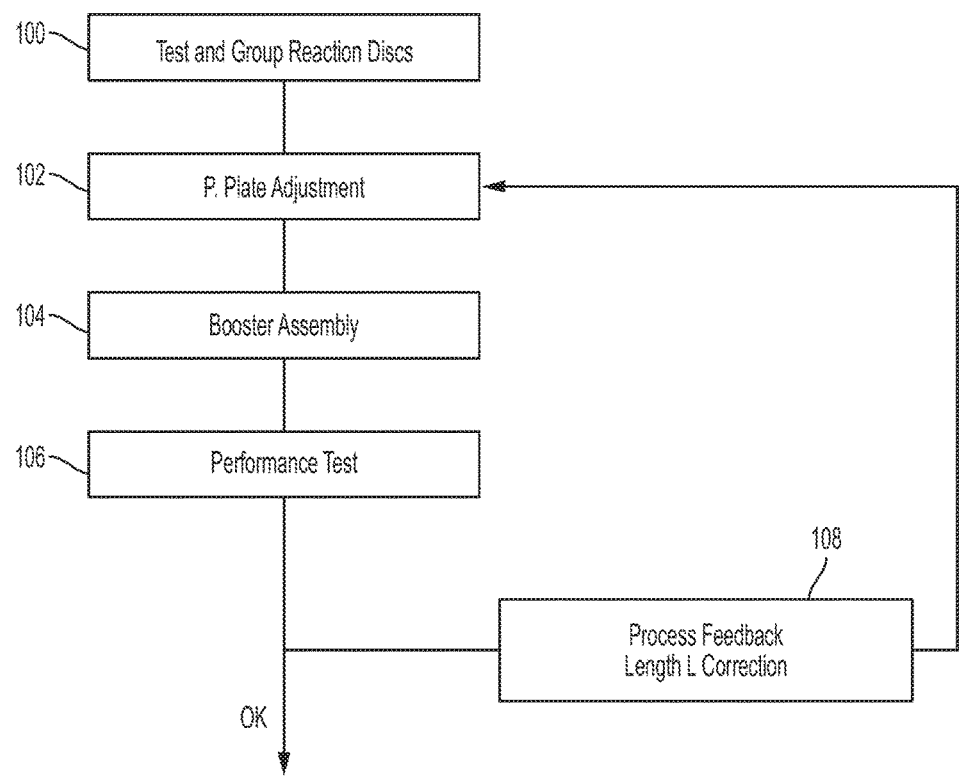
FIG. 10 illustrates a process cycle for the final assembly of vehicle brake boosters.

The process cycle diagram of FIG. 10 illustrates how the reaction discs 36 are load tested and grouped in separate groups at a first step 100. Thereafter, at step 102, the plunger plate adjustment or deformation step with the pressing tool 80 is performed. As noted above, the plunger plate adjustment may include pressing an entire batch of plunger plates 40 to a first axial length L to complement an entire batch of reaction discs 36 that are grouped together based on their load test results. Thereafter, the pressing tool 80 can be adjusted to press a second batch of plunger plates 40 to a second, different axial length L to complement a separate batch of reaction discs 36 that are grouped together based on their load test results. At step 104, the vehicle brake boosters 20 are assembled, including the paired reaction discs 36 and plunger plates 40. The vehicle brake boosters 20 can be assembled in batch form according to the batches of reaction discs 36, or the brake boosters 20 can be assembled in a series including interspersed first and second batch reaction discs 36 as long as the selected reaction discs 36 are paired with the plunger plates 40 of the corresponding batch. At step 106, a performance test is carried on the assembled vehicle brake boosters 20. At least part of the test may involve checking the jump-in force. Based on the test results at step 106, any necessary correction feedback for the plunger plate length setting can be sent to the tool 80, or controller thereof, at step 108. In some constructions, the process may include selecting a specific plunger plate 40 according to a known length parameter (e.g., from "long" or "short" variants) to accompany each given reaction disc 36, depending on whether that reaction disc 36 tested high or low in the load test. It is also noted that the series of brake boosters need not be assembled according to batch production, and in some embodiments may take the form of a single piece flow process. As long as the load tested reaction discs are tracked through the process, the brake booster assembly process can include plunger length selection for each brake booster 20 according to the load test results of the given reaction disc 36 supplied for that brake booster 20.

In some aspects, the invention enables a significant improvement in the statistical variation of brake booster jump-in characteristic, without requiring any significant revision to improve the statistical variation in the manufacture of existing reaction discs, despite that the reaction discs account for the majority of the jump-in variation. Production of brake boosters with more consistent jump-in force results in vehicle production having more consistency in brake pedal feel from vehicle-to-vehicle.

Various features and advantages of the invention are set forth in the following claims.

What is claimed is:

1. A method of manufacturing a series of vehicle brake boosters, each having a brake input member configured to receive a braking input force, a brake output member configured to supply a braking output force in excess of the braking input force, an elastic reaction disc, and a plunger plate, the method comprising:
   load testing a plurality of the reaction discs for the series of vehicle brake boosters, and sorting the load-tested reaction discs into multiple, separate batches based on the load test results;
   forming a first batch of the plunger plates for the series of vehicle brake boosters to an axial length to correspond with a first one of the separate batches of reaction discs;
   assembling a first batch of the series of vehicle brake boosters with the first one of the separate batches of the reaction discs and the first batch of plunger plates to achieve a target jump-in force;
   forming a second batch of the plunger plates for the series of vehicle brake boosters to an axial length to correspond with a second one of the separate batches of reaction discs; and
   assembling a second batch of the series of vehicle brake boosters with the second one of the separate batches of reaction discs and the second batch of plunger plates to achieve the target jump-in force.

2. The method of claim 1, wherein the first and second batches of plunger plates are formed on a brake booster assembly line by a pressing tool.

3. The method of claim 1, wherein at least one of the first and second batches of plunger plates are formed in a separate process preceding arrival at a brake booster assembly line.

4. The method of claim 1, wherein the entire first batch of brake boosters are assembled before assembling the second batch of brake boosters.

5. The method of claim 4, wherein, after assembling the first batch of brake boosters and before assembling the second batch of brake boosters a pressing tool used for forming the plunger plates is adjusted to change the axial length to which the plunger plates are pressed.

6. The method of claim 1, further comprising measuring a height or a diameter of a portion of each plunger plate of the first and second batches of plunger plates and verifying that the height or the diameter is within a predetermined tolerance.

7. The method of claim 1, wherein load testing the plurality of reaction discs comprises determining a test-cycle jump-in force of the plurality of reach discs.

8. The method of claim 7, wherein sorting the load-tested reaction discs into multiple, separate batches includes separating the reaction discs into the first one of the multiple, separate batches of reaction discs when the test-cycle jump-in force is above a predetermined value and separating the reaction discs into the second one of the multiple, separate batches of reaction discs when the test-cycle jump-in force is below the predetermined value.

\* \* \* \* \*